Sept. 15, 1959 A. J. RADCLIFFE, JR 2,904,641

NEGATIVE-IMPEDANCE REPEATER USING A TRANSISTOR AMPLIFIER

Filed Nov. 29, 1955

2,904,641

NEGATIVE-IMPEDANCE REPEATER USING A TRANSISTOR AMPLIFIER

Arthur J. Radcliffe, Jr., La Grange, Ill., assignor to International Telephone and Telegraph Corporation, New York, N.Y., a corporation of Maryland Application November 29, 1955, Serial No. 549,760
6 Claims. (Cl. 179—170)

This invention relates to a negative-impedance repeater using a transistor amplifier. Its principal object is to provide a repeater of the negative-impedance type which is especially suitable for use at the most efficient point in a telephone transmission line, at or near the electrical center thereof. For this purpose, such a repeater should be capable of being powered for a long period of use by a small self-contained battery, and should require a sufficiently small mounting space that it may be readily enclosed and mounted at the desired location along the telephone line, such as on a telephone pole. As contrasted with a vacuum tube amplifier, which requires cathode-heating current, a transistor amplifier is well suited to the foregoing purpose.

Apparently satisfactory negative-impedance repeaters are known which use transistors as two-way amplifiers, but their success depends upon the current-gain factor (alpha) being greater than unity, which occurs only in a point-contact transistor. Investigation has shown, however, that junction transistors are greatly superior to point-contact transistors, particularly at voice frequencies, in such characteristics as freedom from noise, stability, power efficiency, and power-handling ability, but they exhibit a current gain factor less than unity, wherefore they cannot be used in these prior repeaters.

Other known negative-impedance repeaters use junction transistors, but they are unsatisfactory for the purpose at hand because they require a direct-current bias of relatively high voltage, thus requiring a relatively large battery. They also require a voltage-dividing network, as well as blocking condensers in the signal-coupling paths between the transistor terminals, which increase power consumption and add bulk to the equipment.

According to the invention, the foregoing drawbacks are overcome by providing an amplifier which comprises a pair of transistors of opposite conductivity type having complementary characteristics, with a low voltage bias source, and with the output of each transistor coupled through a D.C. path to an input terminal of the other. The line and a local impedance network are coupled to the amplifier, one between the emitter terminals and the other between the collector terminals.

In the preferred form, the D.C. bias source has its full voltage between two end points, and has two intermediate voltage taps. Each transistor is connected with its emitter terminal coupled to an end point, its base terminal to the tap nearest that end, and its collector terminal to the other tap.

The foregoing and other objects and features of this invention and the manner of attaining them will become more apparent, and the invention itself will be best understood, by reference to the following description of an embodiment of the invention taken in conjunction with the accompanying drawings comprising Figs. 1 to 4, wherein.

Essentially, a negative impedance repeater for use with a telephone transmission line comprises (1) a connection to the transmission line, (2) a local impedance network, and (3) an amplifier. These elements are so interconnected that an amplifier feedback signal proportional to the originating line signal is developed across the impedance network.

Such repeaters may be either of the series type or the shunt type. A series repeater is connected in series with the transmission line, increases the signal current by developing a reverse voltage, and is stable if the line connection is open-circuited. A shunt repeater is connected across the line, increases the signal voltage across the line by developing a reverse current, and is stable if short-circuited.

A description of negative-impedance repeaters and the use thereof may be found in the copending United States patent application of Raymond J. Arndt for a Negative-Impedance Repeater Having Gain Controls, Serial Number 507,441, filed May 10, 1955.

Figure 1:
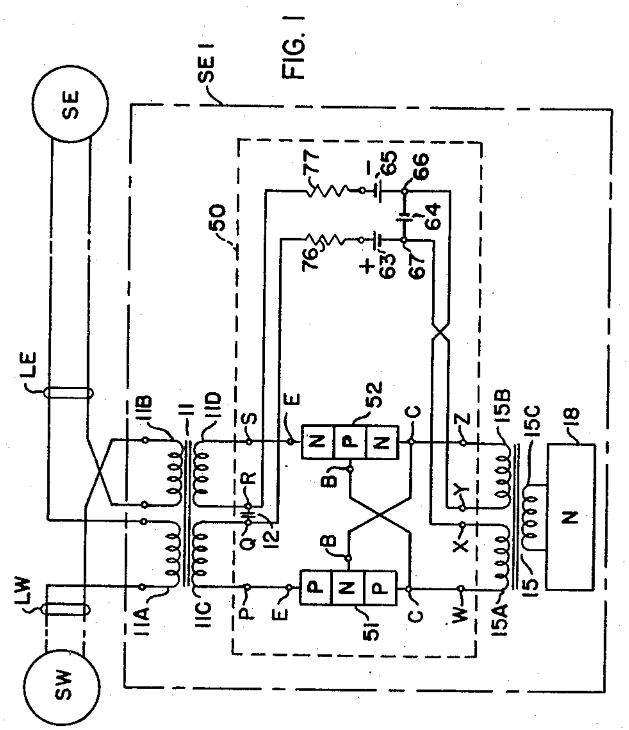
Fig. 1 shows the amplifier used in a series type of negative-impedance repeater.

*Fig. 1—Series repeater*

Referring to Fig. 1, a transmission line connected between telephone stations SW and SE has a series repeater SE1 connected between line sections LW and LE.

The line transformer 11 has windings 11A and 11B connected in aiding relation in series with respective wires of the line. Winding 11C is connected between terminals P and Q of the amplifier 50 and winding 11B is connected between terminals R and S, with condenser 12 connected between terminals Q and R in series with these two windings. The local impedance network 18 is connected to the amplifier 50 by transformer 15. Winding 15A is connected between terminals W and X, and winding 15B between terminals Y and Z of the amplifier, with winding 15C connected to the network 18.

Amplifier 50 comprises a PNP transistor 51 and an NPN transistor 52. These are junction transistors, and should be matched with complementary characteristics.

The bias power supply battery comprises three cells 63, 64, and 65; tapped at point 66 between cells 64 and 65, and at point 67 between cells 63 and 64. With respect to the negative terminal, point 66 may have a positive potential of 1.5 volts; point 67, 3 volts; and the positive terminal, 4.5 volts. The positive terminal is connected through resistor 76 and winding 11C to the emitter terminal of transistor 51, and the negative terminal is connected through resistor 77 and winding 11D to the emitter terminal of transistor 52. Tap 66 is connected through winding 15A to the collector terminal of transistor 51, and also to the base terminal of transistor 52. Tap 67 is connected through winding 15B to the collector terminal of transistor 52, and also to the base terminal of transistor 51. Thus the bias between emitter and base is supplied to transistor 51 by cell 63 and to transistor 52 by cell 65, while bias between collector and base is supplied to each transistor by cell 64.

Signal currents flowing in either direction on the line are coupled through the tranformer 11 and condenser 12 between the emitter terminals of the two transistors. Most of this current flows to the collector terminals and through transformer windings 15A and 15B in series with cell 64. A signal voltage is developed across the windings 15A and 15B which depends on the value and type of impedance network 18 connected across winding 15C. This voltage across these windings 15A and 15B is used for regenerative feedback, and is cross-coupled from the collector terminal of each transistor to the base terminal of the other transistor. This feedback voltage controls the signal current flow through the transistors, and because of the low operating impedance of the transistors between emitter and base terminals, appears practically undiminished between the emitter terminals. Thus, a voltage is developed between input terminals P and S which is the negative of, and equal to, the voltage developed by the local impedance network between terminals W and Z.

Figure 2:
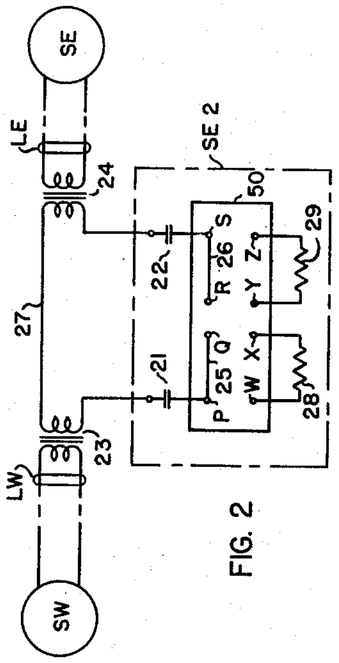
Fig. 2 shows an alternative form of series repeater.

*Fig. 2—Alternative form of series repeater*

In Fig. 2 the amplifier 50 is shown used in a series repeater SE2 which is somewhat simpler than the repeater SE1. The repeater is connected in series with a section of the line through coupling condensers 21 and 22 to terminals P and S, respectively. This section of the line may be coupled through a repeater 23 to line section LW and through a repeater 24 to line section LE, in a connection between stations SW and SE. Wire 27 may be grounded.

The local impedance network comprises resistor 28 between terminals W and X, and resistor 29 between terminals Y and Z. These resistors may be, for example, approximately 500 ohms each when used with a 600 ohm line.

Jumper 25 between terminals P and Q, and jumper 26 between terminals R and S, are used to complete the bias circuit to the emitter terminals. The bias currents to the collector and base terminals flow through the resistors 28 and 29.

The operation is substantially the same as described for repeater SE1.

Figure 3:
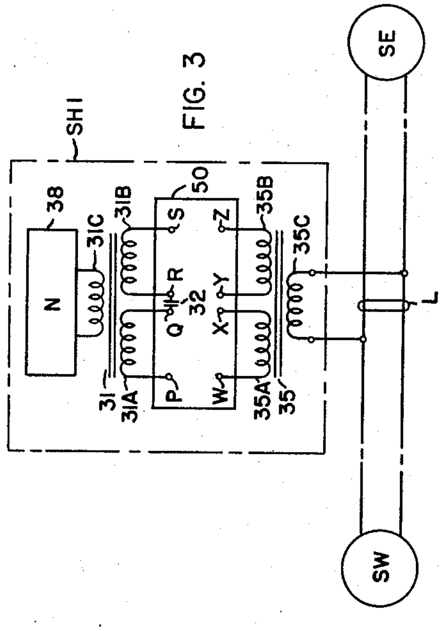
Fig. 3 shows a shunt repeater.

*Fig. 3—Shunt repeater*

In Fig. 3, the amplifier 50 is shown used in a shunt repeater SH1. The repeater is connected through transformer 35 across line L in a connection between stations SW and SE. Winding 35C is connected across the line, while winding 35A is connected between terminals W and X and winding 35B between terminals Y and Z. The local impedance network 38 is coupled by transformer 31 between terminals P and S. Winding 31A is connected between terminals P and Q and winding 31B between terminals R and S, in series with a condenser 32 between terminals Q and R. Winding 31C is connected across the network 38.

Operation is essentially described for repeater SE1. Signal voltage proportional to the originating line signal is applied to the base terminals of the transistors. Signal current which depends on the value and type of the network 38 appears across the line as the reverse of the line shunt current.

Figure 4:
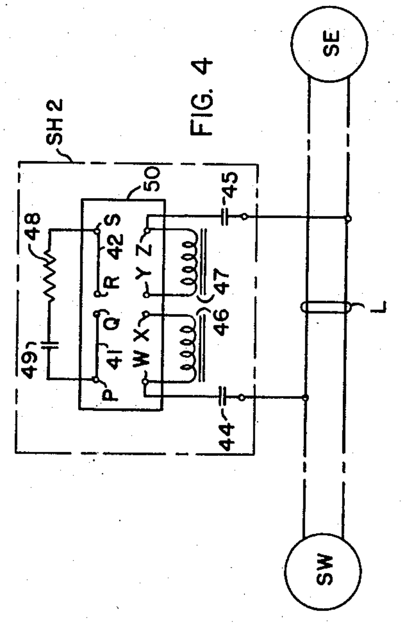
Fig. 4 shows an alternative form of shunt repeater.

*Fig. 4—Alternative shunt repeater*

In Fig. 4 a shunt repeater SH2 which is somewhat simpler than the repeater SH1 is shown coupled across line L between stations SW and SE. Terminals W and Z are coupled by condensers 44 and 45 to respective wires of the line. The network comprises a resistor 48 in series with a coupling condenser 49 connected between terminals P and S. Jumper 41 between terminals P and Q, and jumper 42 between terminals R and S completes the bias circuit to the emitter terminals. A choke coil 46 between terminals W and X have a choke coil 47 between terminals Y and Z furnish a path for the bias current to the collector and base terminals while blocking the signal currents. The operation is similar to that described for repeater SH1.

The line connections and local impedance networks shown in Figs. 1 to 4 are representative, and may be used in various combinations.

A negative-impedance repeater as described herein has such a low power drain that with appropriate adjustment it would operate continuously for several months from the power of mercury dry cells having a combined volume of only two or three cubic inches. A repeater in one of the simpler forms, complete with batteries, could be placed in a can such as is used for a standard telephone repeating coil. It is known that negative impedance repeaters yield the best results when used near the electrical center of the line. Since this repeater is small and self-contained it may easily be mounted at the desired location, such as on a telephone pole.

While I have described above the principles of my invention in connection with specific apparatus, it is to be clearly understood that this description is made only by way of example and not as a limitation to the scope of my invention.

I claim:

1. In a negative-impedance type of repeater for reducing the loss in strength of signals transmitted over an associated transmission line, an amplifier coupled to the line and to a local impedance network, the amplifier comprising two similar transistors which are of opposite conductivity types, each transistor having an emitter terminal, a base terminal, and a collector terminal, first coupling means connected between one of said terminals of one transistor and the similar terminal of the other transistor for coupling the amplifier to the said line, second coupling means connected between another of said terminals of the said one transistor and the similar terminal of the other transistor for coupling the amplifier to the said local impedance network, direct-current means in circuit relation with the electrodes of the transistors for biasing said electrodes to operating condition, and local signal-coupling means through direct-current paths for coupling signals from each transistor to an input terminal of the other, the said direct-current paths being included in the said direct-current means.

2. A negative-impedance type of repeater according to claim 1, wherein the said local signal-coupling means comprises a connection through a direct-current path from the collector terminal of each of the said transistors to the base terminal of the other said transistor.

3. A negative-impedance type of repeater according to claim 2, wherein the said direct-current means comprises a direct-current power supply having a positive terminal, a negative terminal, and two intermediate voltage taps, the first said tap being nearer the positive terminal and the second said tap being nearer the negative terminal, means connecting the emitter terminal to the positive terminal, the base terminal to the first tap, and the collector terminal to the second tap of one said transistor, and means connecting the emitter terminal to the negative terminal, the base terminal to the second tap, and the collector terminal to the first tap of the other said transistor, so that bias current flows in the forward direction of the diode of each transistor between the emitter and base terminals, and in the reverse direction of the diode of each transistor between the collector and base terminals.

4. A negative-impedance type of repeater according to claim 1, wherein the said transistors are of the junction type.

5. A negative-impedance type of repeater according to claim 1, wherein the said first coupling means is in series with the said transmission line and is connected between the emitter terminals of the said transistors, and the said second coupling means is connected between the collector terminals of the said transistors.

6. A negative-impedance type of repeater according to claim 1, wherein the said first coupling means is connected in shunt across the said transmission line and is connected between the collector terminals of the said transistors, and the said second coupling means is connected between the collector terminals of the said transistors.

References Cited in the file of this patent

UNITED STATES PATENTS

| | | |
|---|---|---|
| 2,582,498 | Merrill | Jan. 15, 1952 |
| 2,585,078 | Barney | Feb. 12, 1952 |
| 2,733,415 | Bangert | Jan. 31, 1956 |